UNITED STATES PATENT OFFICE.

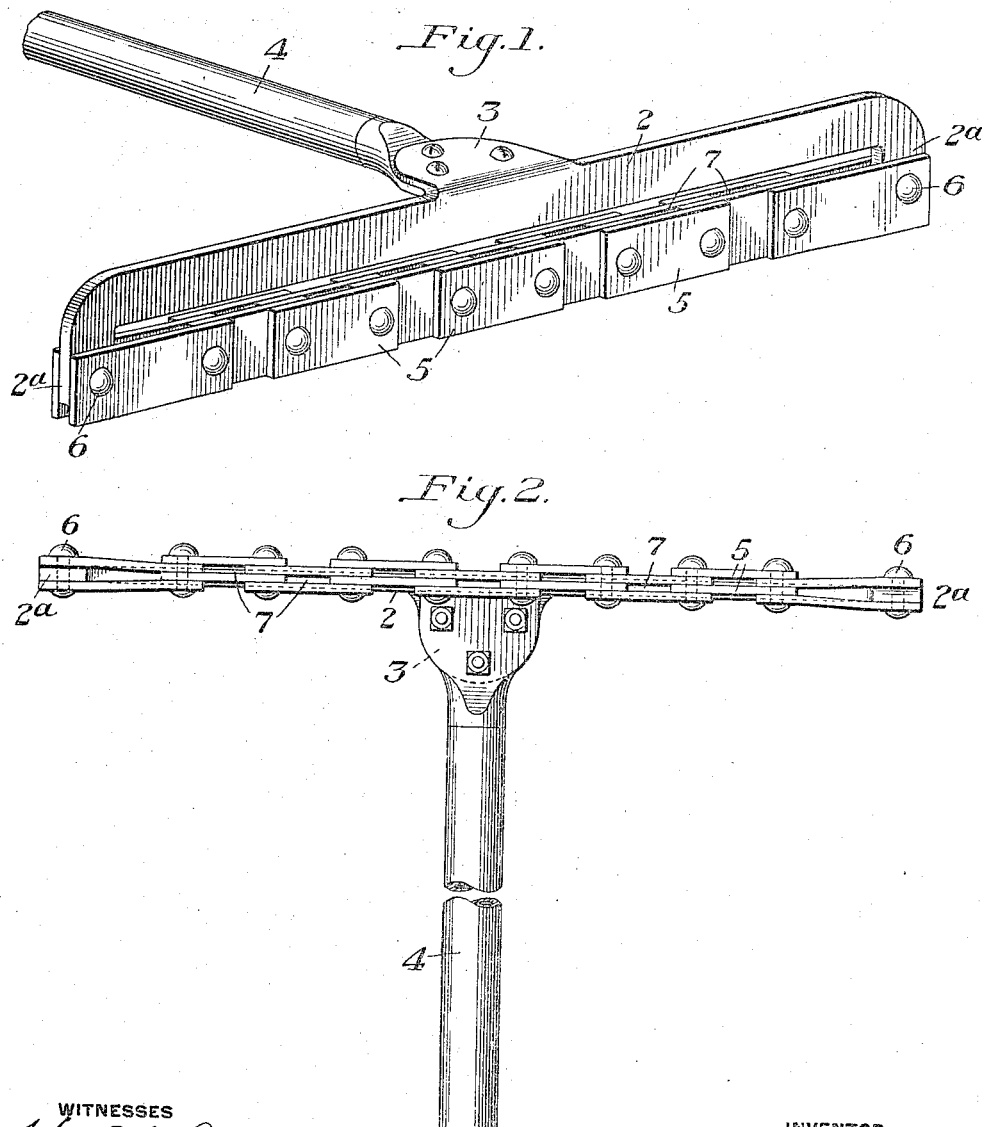

ORLANDO B. CARNAHAN, OF MONONGAHELA, PENNSYLVANIA, ASSIGNOR TO WINDOW GLASS MACHINE COMPANY, OF PITTSBURGH, PENNSYLVANIA, A CORPORATION OF NEW JERSEY.

SCRAPER FOR GLASS FLATTENING STONES.

1,229,711.      Specification of Letters Patent.      Patented June 12, 1917.

Application filed July 12, 1916. Serial No. 108,952.

*To all whom it may concern:*

Be it known that I, ORLANDO B. CARNAHAN, a citizen of the United States, residing at Monongahela, Washington county, Pennsylvania, have invented a new and useful Scraper for Glass Flattening Stones, of which the following is a full, clear, and exact description, reference being had to the accompanying drawings, forming part of this specification, in which—

Figure 1 is a perspective view of a scraper embodying my invention, and

Fig. 2 is an inverted plan view of the same.

My invention has relation to scraping tools for glass flattening stones, and is designed to provide a tool of this character which will be peculiarly effective by reason of the fact that its scraping portion or blade is made flexible so as to readily adapt itself to inequalities in the surface of the stones.

Referring to the accompanying drawings, in which I have shown the preferred embodiment of my invention, the numeral 2 designates a suitable holder consisting of a bar having its end portions bent downwardly as at 2ª, and which is provided with a central lug or projection 3, to which a suitable handle or operating member 4 may be attached. The scraping member or blade of the tool consists of a plurality of relatively short edgewise disposed blade members 5. These blade members are connected to each other, and the end blade members are connected to the downwardly turned end portion 2ª of the holder, by means of pivots 6, which may be in the form of loose rivets. Each section of the blade thus formed is composed of two substantially parallel blade members whose end portions overlap the members of adjacent sections at the joints, the members of adjacent sections being staggered with respect to each other. This overlapping of the sections also spaces them apart in each section to an extent substantially equal to the thickness of said members. The members of alternate sections are preferably separated from each other endwise by the spaces 7, which are sufficiently wide to permit each section to move vertically relative to its neighbors.

This construction of the scraper blade is peculiarly effective in its operation, due to the plurality of scraping edges which it provides and to the facility with which it yields to the surface of a flattening stone.

I do not, however, wish to limit myself to the particular construction which I have herein shown and described, as this may be varied in detail without departing from the spirit and scope of my invention as defined in the appended claims.

I claim:

1. A scraping tool for glass flattening stones, comprising a holder, and a sectional scraping blade connected to the holder at the end portions and having the sections flexibly connected to permit of its vertical flexing, substantially as described.

2. A scraping tool for flattening stones having a holder and a jointed scraping blade supported thereby, each section of said blade comprising a plurality of scraping members arranged side by side, substantially as described.

3. A scraping tool for flattening stones having a holder and a jointed scraping blade each section of which comprises a plurality of edgewise disposed scraper blades, substantially as described.

4. A scraping tool for flattening stones, comprising a holder and a jointed scraper blade, each section of said blade comprising a plurality of edgewise disposed scraper members, the members of each section being pivotally connected to the members of adjacent sections, and the end sections being pivotally connected to the holder, substantially as described.

5. A scraping tool for flattening stones, comprising a holder and a jointed scraping blade, the sections of said blade consisting each of a plurality of edgewise disposed substantially parallel scraping members, the members of adjacent sections being staggered with respect to each other, substantially as described.

6. A scraping tool for flattening stones, comprising a holder and a jointed flexible scraping blade pivotally connected at its ends to the holder, each section of the blade consisting of a plurality of edgewise disposed laterally separated scraping members, and the members of each section being separated at their ends from adjacent members in line therewith, substantially as described.

In testimony whereof, I have hereunto set my hand.

ORLANDO B. CARNAHAN.

Witnesses:
ELIZABETH ELWOOD,
R. G. DEAN.

Copies of this patent may be obtained for five cents each, by addressing the "Commissioner of Patents, Washington, D. C."